Figure 1:
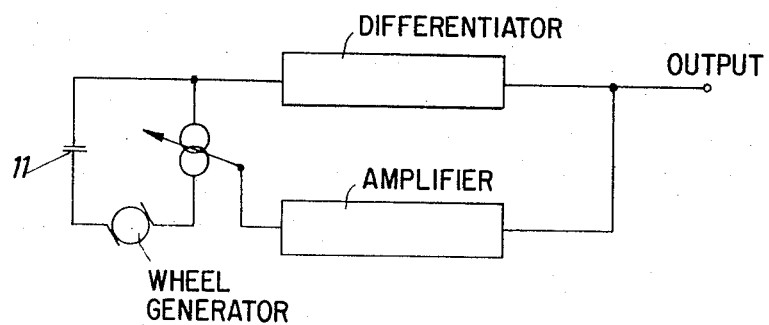

United States Patent [19]

Erath

[11] 3,860,298

[45] Jan. 14, 1975

[54] ELECTRICAL ANTISKID DEVICE FOR VEHICLES

[75] Inventor: Wolfgang Erath, Munich, Germany

[73] Assignee: Knorr-Bremse GmbH, Munich, Germany

[22] Filed: Mar. 21, 1973

[21] Appl. No.: 343,476

[30] Foreign Application Priority Data
Mar. 22, 1972 Germany.............................. 2213845

[52] U.S. Cl............................ 303/21 BE, 188/181 C
[51] Int. Cl.............................................. B60t 8/08
[58] Field of Search ....................... 180/82 R, 105 E; 188/181 C; 303/20, 21; 317/5; 324/160–161; 340/53, 263, 62; 307/10 R, 109; 320/1

[56] References Cited
UNITED STATES PATENTS

| | | | |
|---|---|---|---|
| 3,578,819 | 5/1971 | Atkins............................ | 303/21 BE |
| 3,663,070 | 5/1972 | Scharlack......................... | 303/21 P |
| 3,690,735 | 9/1972 | Arai et al. ........................ | 303/21 P |
| 3,729,234 | 4/1973 | Hirzel ............................. | 303/21 BE |

FOREIGN PATENTS OR APPLICATIONS

| | | | |
|---|---|---|---|
| 909,255 | 10/1962 | Great Britain................. | 303/21 BE |

*Primary Examiner*—George E. A. Halvosa
*Assistant Examiner*—Stephen G. Kunin
*Attorney, Agent, or Firm*—Edmund M. Jaskiewicz

[57] ABSTRACT

Railway and other vehicles may be provided with an electrical antiskid device which includes a generator coupled to the axle for generating a voltage proportional to the rotary speed of the axle and a capacitor charged by the generated voltage and discharging a voltage for comparison to the generated voltage. A differentiating element is connected to the capacitor and a difference amplifier is connected to a reference voltage source and to the differentiating element to regulate the discharge current of the capacitor in opposition to any deviation of the differentiated voltage from the reference voltage.

1 Claim, 2 Drawing Figures

//  3,860,298

ELECTRICAL ANTISKID DEVICE FOR VEHICLES

The present invention relates to an electrical antiskid device for railway and other vehicles, more particularly, for producing an accurate and precise reference voltage against which a generated voltage can be compared.

Electrical antiskid devices have been employed in railway vehicles and other vehicles wherein a generator is drivingly connected to an axle so as to generate a voltage proportional to the rotary speed of the axle. This generated voltage then charges a capacitor whose discharge voltage is produced through discharge with a regulated constant current. The discharge voltage is employed as a reference voltage against which the generated voltage is compared.

The reference voltage consists of a linear voltage which gradually decreases with respect to time and which is obtained by discharging the capacitor with a controlled constant current. Such a reference voltage must have a very high degree of accuracy, such as a deviation from linearity of less than 1/1,000 and a temperature stability of less than 1/100. In order to meet these standards, the capacitor must be constructed according to very high requirements with regard to both temperature stability and the residual current. However, such requirements can only be met by very large and expensive plastic foil capacitors.

It is therefore the principal object of the present invention to provide a novel and improved electrical antiskid device of the nature described above.

It is another object of the present invention to provide such an electrical antiskid device in which a linear voltage of very great accuracy is obtained by the use of simple and inexpensive components.

According to one aspect of the present invention, an electrical antiskid device for railway and other vehicles having a generator to generate a voltage proportional to the rotary speed of an axle and a capacitor charged by the generated voltage to discharge a reference voltage is further provided with a differentiating element to differentiate the discharge voltage of the capacitor and a discharge amplifier which, in the event of the deviation of the differentiated voltage from a reference voltage, regulates the discharge current of the capacitor in opposition to such deviation of the differentiated voltage from the reference voltage.

Figure 2:
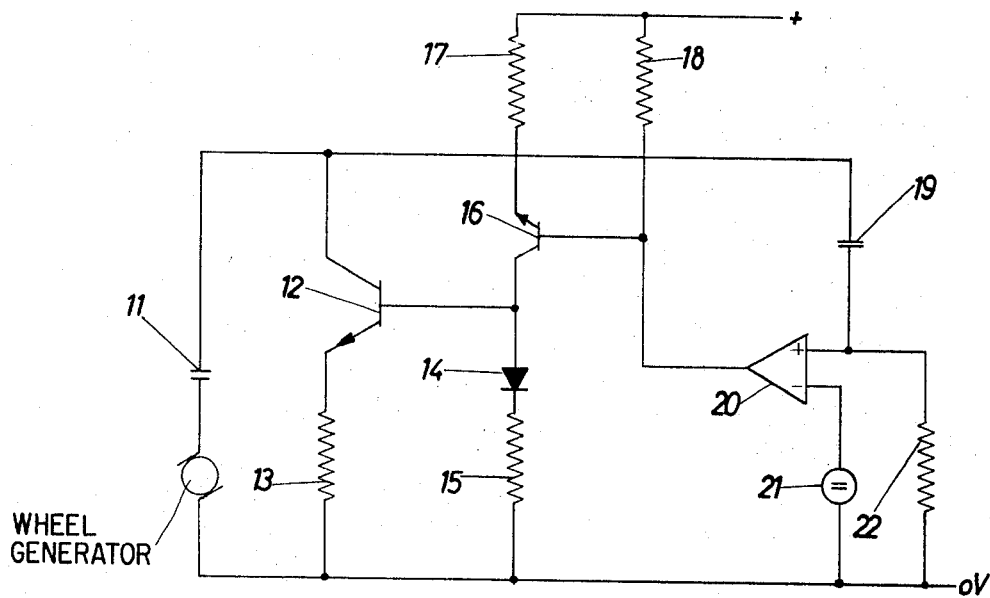

Other objects and advantages of the present invention will be apparent upon reference to the accompanying description when taken in conjunction with the following drawings which are merely exemplary, wherein;

FIG. 1 is a block diagram showing schematically a portion of the device according to the present invention; and FIG. 2 is a schematic diagram showing the electrical circuit corresponding to the block diagram of FIG. 1.

Proceeding next to the drawings wherein like reference symbols indicate the same parts throughout the various views, a specific embodiment of the present invention will be described in detail.

In FIG. 1 there is shown a capacitor 11 which is charged by a generator drivingly connected to a wheel axle whose speed is to be monitored. The generator is not shown in the drawings. In the event the vehicle skids which would include sliding or lateral skidding, a sudden and pronounced drop will occur in the generated voltage and the capacitor 11 will be discharged. The discharged voltage can be employed for comparison with the generated voltage.

The discharge voltage of the capacitor 11 is differentiated with respect to time in the block marked "differentiator" which will be subsequently described in detail. The slope of the discharge voltage will be maintained constant independently of the size of the capacitor 11 by discharging the capacitor 11 by means of the differentiated voltage through an amplifier and a source of current.

As may be seen in FIG. 2, the current source through which capacitor 11 is discharged includes a transistor 12 and an emitter resistor 13. The bias voltage of the transistor is determined by a diode 14 and a resistor 15 connected in series therewith. The discharge voltage of capacitor 11 is differentiated with respect to time by a differentiating element consisting of a capacitor 19 and a resistor 22. The differentiated discharge voltage is supplied in an input of a sum and differences amplifier 20 whose other input is connected to a voltage source 21 which supplies a reference voltage.

The output of difference amplifier 20 is connected to the base of a transistor 16 whose emitter is connected to the base of transistor 12. A voltage is supplied to the collector and base of the transistor 16 through resistors 17 and 18 respectively.

If the slope of the discharge voltage of capacitor 11 is too great, an excessive negative voltage will be produced on the differentiation element 19, 22. As a result, the output signal of difference amplifier 20 will change over to positive values so that the transistor 16 will conduct less current, the voltage drop on diode 14 becomes smaller and, as a result, the discharge current of capacitor 11 and accordingly its discharge slope becomes smaller.

It is to be born in mind that the present invention is not limited to an electrical antiskid device of the above mentioned type but can be advantageously employed in time delay switches for long periods of time of the magnitude of several hours, testing devices, and generally in any apparatus where a very precise linearly increasing or decreasing voltage is required.

It is pointed out that an ordinary inexpensive electrolyte capacitor can be employed in the present invention because every disturbing variable including temperature dependent variables, residual current, tolerances are controlled. These variables are controlled since the discharge current is not regulated but the value to be maintained constant is controlled directly independently of the discharge current which is required should a variable of the capacitor change and independently of the discharge voltage which may change with time, namely, the slope of the discharge voltage.

A further advantage of the device of the present invention is that the differentiating element required in the control circuit is also generally required in the antiskid device itself for determining the actual deceleration of the wheel. Thus, the cost of manufacturing an antiskid device according to the present invention is kept at a minimum.

It will be understood that this invention is susceptible to modification in order to adapt it to different usages and conditions, and accordingly, it is desired to comprehend such modifications within this invention as may fall within the scope of the appended claims.

What is claimed is;

1. In an electrical antiskid device for railway vehicles and other vehicles, the combination of means for generating a voltage proportional to the rotary speed of an axle of a vehicle, a capacitor charged by said generated voltage and discharging a voltage produced by a discharge with regulated constant current for comparison to said generated voltage, a differentiating element connected to said capacitor to differentiate the discharge voltage therefrom, a difference amplifier having inputs connected to a reference voltage source and to said differentiating element, a second transistor having its base connected to the output of said difference amplifier, and a discharge transistor and an emitter resistor connected thereto through which said capacitor is discharged and having a collector connected to said capacitor and to said differentiating element to regulate the discharge current of said capacitor in opposition to any deviation of the differential voltage from the reference voltage.

* * * * *